United States Patent
Wang et al.

(10) Patent No.: US 12,381,583 B2
(45) Date of Patent: Aug. 5, 2025

(54) DUAL 6GHZ RADIO ARRANGEMENT FOR ACCESS POINT

(71) Applicant: Hewlett Packard Enterprise Development LP, Spring, TX (US)

(72) Inventors: Bo Wang, Beijing (CN); Hongli Zhang, Beijing (CN); Kehui Cai, Beijing (CN); Kuanyue Li, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 375 days.

(21) Appl. No.: 18/168,634

(22) Filed: Feb. 14, 2023

(65) Prior Publication Data

US 2024/0275411 A1 Aug. 15, 2024

(51) Int. Cl.
*H04B 1/00* (2006.01)
*H04W 84/12* (2009.01)
*H04W 88/08* (2009.01)

(52) U.S. Cl.
CPC ........... *H04B 1/0057* (2013.01); *H04W 84/12* (2013.01); *H04W 88/08* (2013.01)

(58) Field of Classification Search
CPC .................................................. H04B 1/0057
See application file for complete search history.

(56) References Cited

U.S. PATENT DOCUMENTS

| | | | |
|---|---|---|---|
| 10,326,484 B1* | 6/2019 | Ayranci | H04B 1/006 |
| 10,560,134 B2 | 2/2020 | Ho et al. | |
| 2020/0015219 A1* | 1/2020 | Asterjadhi | H04W 72/51 |
| 2021/0184707 A1 | 6/2021 | Hasnain | |
| 2022/0014165 A1 | 1/2022 | Cai et al. | |

FOREIGN PATENT DOCUMENTS

| | | |
|---|---|---|
| WO | 2018/223049 A1 | 12/2018 |
| WO | 2019/027494 A1 | 2/2019 |
| WO | 2019/125433 A1 | 6/2019 |
| WO | 2020/180077 A1 | 9/2020 |
| WO | 2021/010764 A1 | 1/2021 |
| WO | 2021/133399 A1 | 7/2021 |
| WO | 2021/222794 A1 | 11/2021 |

* cited by examiner

*Primary Examiner* — Hsinchun Liao
(74) *Attorney, Agent, or Firm* — Hewlett Packard Enterprise Patent Department

(57) ABSTRACT

In implementations of the present disclosure, there is provided an access point (AP) radio arrangement for Wi-Fi. A method comprises selecting a filter for a first antenna from a first set of filters. The method further comprises determining a subset from a second set of filters based on the selected filter. The method further comprises selecting a filter for a second antenna from the subset. Implementations of the present disclosure can make full use of 6 GHz channels, and the combinations for dual 6 GHz usage scenarios can be more flexible.

20 Claims, 12 Drawing Sheets

400A

| CHANNELS FOR THE FIRST SET OF FILTERS | FREQUENCY BAND |
|---|---|
| CHANNEL 31 | 5945-6265MHZ |
| CHANNEL 95 | 6265-6585MHZ |
| CHANNEL 159 | 6585-6885MHZ |
| CHANNEL 63 | 6105-6425MHZ |

| CHANNELS FOR THE SECOND SET OF FILTERS | FREQUENCY BAND |
|---|---|
| CHANNEL 63 | 6105-6425MHZ |
| CHANNEL 127 | 6425-6745MHZ |
| CHANNEL 191 | 6745-7125MHZ |
| CHANNEL 159 | 6585-6885MHZ |

*FIG. 4B*

DUAL 6GHZ RADIO ARRANGEMENT FOR ACCESS POINT

BACKGROUND

Wi-Fi 7 (IEEE 802.11be) is a Wi-Fi standard, which can improve wireless experience and accelerate emerging use cases. The use cases of Wi-Fi may include low-latency extended reality (XR), social cloud-based gaming, 8K video streaming, and simultaneous video conferencing and casting. Wi-Fi 7 solutions can enhance speed, latency and network capacity plus support for advanced features like 320 megahertz (MHz) channels, 4K quadrature amplitude modulation (QAM) and advanced multi-link implementations such as high band simultaneous multi-link.

Wi-Fi 7 can enable significantly faster speeds by packing more data into each transmission. 320 MHz channels are twice the size of previous Wi-Fi generations. Compared to 1K QAM with Wi-Fi 6/6E, 4K QAM can enable each signal to embed a greater amount of data more densely. Wi-Fi 7 increases the maximum available bandwidth to 320 MHz on the 6 gigahertz (GHz) band. The wider 320 MHz channels provided by Wi-Fi 7 allow more data to be transmitted via an access point (AP).

BRIEF DESCRIPTION OF THE DRAWINGS

Implementations of the present disclosure may be understood from the following Detailed Description when read with the accompanying figures. In accordance with the standard practice in the industry, various features are not drawn to scale. In fact, the dimensions of the various features may be arbitrarily increased or reduced for clarity of discussion. Some examples of the present disclosure are described with reference to the following figures.

FIG. 4A illustrates an example of channels for a first set of filters according to implementations of the present disclosure;

FIG. 4B illustrates an example of channels for a second set of filters according to implementations of the present disclosure;

DETAILED DESCRIPTION

Figure 1A:
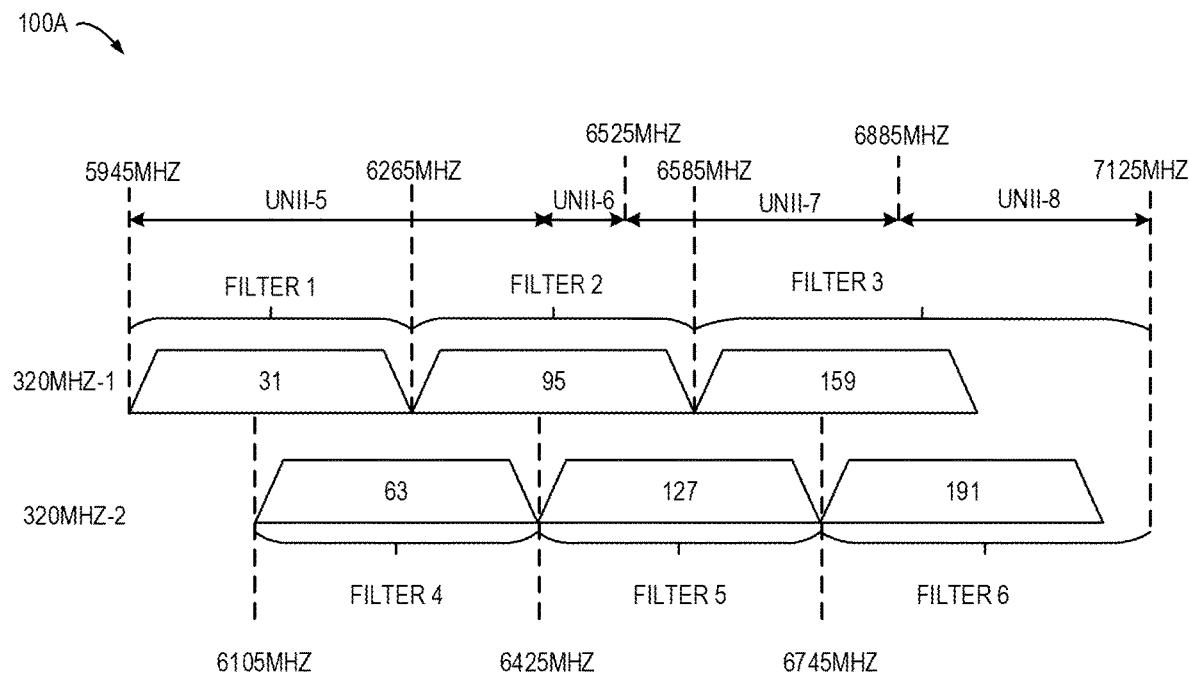
FIG. 1A illustrates an example of two sets of filters in 6 GHz band according to implementations of the present disclosure.

As discussed above, Wi-Fi 7 increases the maximum available bandwidth to 320 MHz in the 6 GHz frequency band. Thus, one of the several improvements of Wi-Fi 7 is that it will be able to utilize large 320 MHz channels to allow users to benefit from new and emerging applications. This benefit extends well beyond traditional Internet connectivity.

Wi-Fi 7 defines a total of six channels of 320 MHz in the 6 GHz frequency band. The six channels of 320 MHz are formed into two banks, which are 320 MHz-1 and 320 MHz-2. In the 320 MHz-1 bank, there are three channels, including channel 31, channel 95 and channel 159. The frequency band of channel 31 ranges from 5945 MHz to 6265 MHz, the frequency band of channel 95 ranges from 6265 MHz to 6585 MHz, and the frequency band of channel 159 ranges from 6585 MHz to 6905 MHz. In the 320 MHz-2 bank, there are also three channels, including channel 63, channel 127 and channel 191. The frequency band of channel 63 ranges from 6105 MHz to 6425 MHz, the frequency band of channel 127 ranges from 6425 MHz to 6745 MHz, and frequency band of channel 191 ranges from 6745 MHz to 7065 MHz. It can be seen that there is some overlap between 320 MHz-1 and 320 MHz-2. For example, channel 31 in the 320 MHz-1 bank and channel 63 in the 320 MHz-2 bank may have an overlap of 160 MHz. For another example, channel 95 in the 320 MHz-1 bank and channel 63 in the 320 MHz-2 bank may have an overlap of 160 MHz, and channel 95 in the 320 MHz-1 bank and channel 127 in the 320 MHz-2 bank may have an overlap of 160 MHz. These overlaps may render at least one 320 MHz channel unusable and lose the possibility of some dual 320 MHz channel combinations in the access point.

One traditional radio arrangement for the access point has a filter with a band pass of 5945 MHz to 6425 MHz, and another filter with a band pass of 6525 MHz to 7125 MHz. This arrangement does not support the UNII-6, which has a bandwidth of 100 MHz from 6425 MHz to 6525 MHz. It can be seen that the 6 GHz frequency band is divided with two simple filter banks, and thus only three 320 MHz channel combinations are available on the dual 6 GHz radio. Another traditional radio arrangement for the access point has a filter with a band pass of 5945 MHz to 6425 MHz, and another filter with a band pass of 6265 MHz to 7125 MHz. It can be seen that while this arrangement supports UNII-6, no 320 MHz channel combination is available on the dual 6 GHz radio.

Although the traditional solutions may provide 320 MHz availability for an access point, the traditional solutions waste the majority of the 320 MHz frequency band. There is a need to make all channels of 320 MHz available and maximize the frequency band in a dual 6 GHz configuration in a 2*2 MIMO (multi-input multi-output) system or the even more MIMO system.

Therefore, implementations of the present disclosure propose a new solution of access point radio arrangement of the dual 6 GHz Wi-Fi 7, and the proposed solution may be implemented through at least two sets of filters. According to implementations of the present disclosure, the filters of the access point are divided into two sets. The first set is used for a first antenna of the access point, while the second set is for a second antenna of the access point. A filter is first selected from the first set of filters. Based on the selected filter, another filter is determined from the second set of filters.

As an example, a filter in the first set of filters is first determined, and then a filter in the second set of filters can be selected on this basis. The first set of filters has four filters and the four filters in the first set of filters work on channel 31, channel 95, channel 159 and channel 63, respectively. The second set of filters also has four filters and the four filters in the second set of filters work on channel 63, channel 127, channel 191 and channel 159, respectively.

In this manner, all 6G channels are available according to the proposed radio arrangement, and all 320 MHz channels can be selected due to the filters combination from the two sets. For example, the determined filter in the first set of filters and the selected filter in the second set of filters can be used simultaneously. The overlap between the two working filters can be eliminated. Therefore, all 6 GHz channels are available, and no channel will be discarded if the filters are selected properly. Furthermore, since the selection mechanism of the filters is flexible, it can achieve more flexible combination for dual 6G usage scenarios.

Advantages of implementations of the present disclosure will be described with reference to example implementations as described below. Reference is made below to FIG. 1A through FIG. 8 to illustrate basic principles and several example implementations of the present disclosure herein.

FIG. 1A illustrates an example of two sets of filters according to implementations of the present disclosure. As shown in FIG. 1A, there are three channels of a 320 MHz-1 bank. In the 320 MHz-1 bank, there are three channels, including channel 31, channel 95 and channel 159. The frequency band of channel 31 ranges from 5945 MHz to 6265 MHz, the frequency band of channel 95 ranges from 6265 MHz to 6585 MHz, and the frequency band of channel 159 ranges from 6585 MHz to 6905 MHz.

As shown in FIG. 1A, there are three channels of a 320 MHz-2 bank. In the 320 MHz-2 bank, there are also three channels including channel 63, channel 127 and channel 191. The frequency band of channel 63 ranges from 6105 MHz to 6425 MHz, the frequency band of channel 127 ranges from 6425 MHz to 6745 MHz, and the frequency band of channel 191 ranges from 6745 MHz to 7065 MHz.

Table 101 in FIG. 1A shows two sets of filters arrangement according to implementations of the present disclosure. For the first set of filters, a filter 1, a filter 2, a filter 3, and a filter 4 may be included in the first set of filters. For the second set of filters, the filter 4, a filter 5, a filter 6, and the filter 3 may be included in the second set of filters. By use of two sets of filters arrangement according to implementations of the present disclosure, more flexible combinations for dual 6G usage scenarios may be achieved.

Figure 1B:
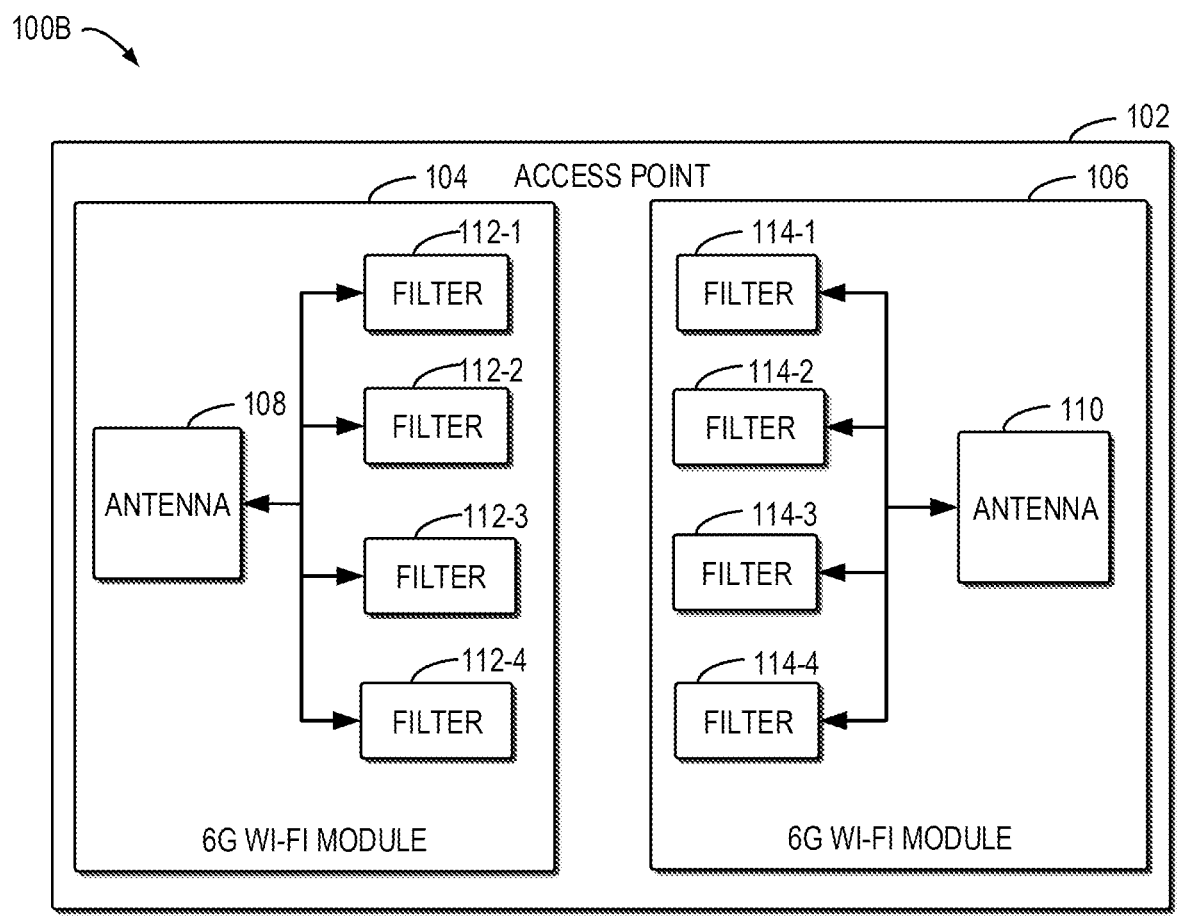
FIG. 1B illustrates a block diagram of an example environment in which example implementations of the present disclosure may be implemented.

FIG. 1B illustrates a block diagram of an example environment 100B in which example implementations of the present disclosure may be implemented. As shown in FIG. 1B, the environment 100B comprises an access point 102. The access point 102 comprises two 6 GHz Wi-Fi modules, including a 6 GHz Wi-Fi module 104 and a 6 GHz Wi-Fi module 106.

As shown in FIG. 1B, the 6 GHz Wi-Fi module 104 includes an antenna 108. The 6 GHz Wi-Fi module 104 further includes a filter 112-1, a filter 112-2, a filter 112-3, and a filter 112-4, and the filters 112-1, 112-2. 112-3 and 112-4 may be collectively referred as the first set of filters. The four filters in the first set of filters are used to filter signals for the antenna 108. Likewise, the 6 GHz Wi-Fi module 106 includes an antenna 110. The 6 GHz Wi-Fi module 106 further includes a filter 114-1, a filter 114-2, a filter 114-3, and a filter 114-4, the filters 114-1, 114-2, 114-3 and 114-4 may be collectively referred as the second set of filters. The four filters in the second set of filters are used to filter signals for the antenna 110.

It is noted that for the purpose of clarity only, in FIG. 1B, the filter 112-4 and the filter 114-1 are shown separately. In some implementations, the filter 112-4 and the filter 114-1 may be the same filter, and this filter may be used by the 6 GHz Wi-Fi module 104 and the 6 GHz Wi-Fi module 106 together. Alternatively, the filter 112-4 and the filter 114-1 may be different filters. However, the filter 112-4 and the filter 114-1 may work on the same frequency band. The filter 112-3 and the filter 114-4 may be also the same filter or different filters.

With the antenna 108 and antenna 110, the access point 102 can enable communications between the network and user devices on 6 GHz channels. For example, one of the filters 112-1, the filters 112-2, the filters 112-3, and the filters 112-4 may be selected for the antenna 108. One of the filters 114-1, the filters 114-2, the filters 114-3, and the filters 114-4 may be selected for the antenna 110. As such, the access point 102 can support dual 6 GHz frequency band.

In some implementations, the filter 112-1 may be a band pass filter, and the filter 112-1 may work on a frequency band pass of 5945 MHz to 6265 MHz. The frequency band pass of the filter 112-1 may correspond to the channel 31. In some implementations, the filter 112-2 may be a band pass filter, and the filter 112-2 may work on a frequency band pass of 6265 MHz to 6585 MHz. The frequency band pass of the filter 112-2 may correspond to the channel 95. In some implementations, the filter 112-3 may be a band pass filter, and the filter 112-3 may work on a frequency band pass of 6585 MHz to 7125 MHz. The frequency band pass of the filter 112-3 may correspond to the channel 159. In some implementations, the filter 112-4 may be a band pass filter, and the filter 112-4 may work on a frequency band pass of 6105 MHz to 6425 MHz. The frequency band pass of the filter 112-4 may correspond to the channel 63.

In some implementations, the filter 114-1 may be a band pass filter, and the filter 114-1 may work on a frequency band pass of 6105 MHz to 6425 MHz. The frequency band pass of the filter 114-1 may correspond to the channel 63. In some implementations, the filter 114-2 may be a band pass filter, and the filter 114-2 may work on a frequency band pass of 6425 MHz to 6745 MHz. The frequency band pass of the filter 114-2 may correspond to the channel 127. In some implementations, the filter 114-3 may be a band pass filter, and the filter 114-3 may work on a frequency band pass of 6745 MHz to 7125 MHz. The frequency band pass of the filter 114-3 may correspond to the channel 191. In some implementations, the filter 114-4 may be a band pass filter, and the filter 114-4 may work on a frequency band pass of 6585 MHz to 7125 MHz. The frequency band pass of the filter 112-4 may correspond to the channel 159. The access point 102 also includes other components, for example, a memory, physical network interfaces, and so forth.

A proper way of selection of filters will improve the availability of channels. The 6G Wi-Fi module 104 may scan channels in the 320 MHz-1 frequency band to obtain configuration information. In some implementations, the 6G Wi-Fi module 104 may scan channels in the 320 MHz-1 frequency band by using each of the first set of filters to obtain the configuration information. The configuration information may include information of a priority of filters in the first set of filters, such as a priority list or a table. After the configuration information is obtained, a filter will be determined for the antenna 108.

In some implementations, the 6G Wi-Fi module 104 may obtain channel qualities corresponding to filters in the first set of filters. The 6G Wi-Fi module 104 may select a filter from the first set of filters based on the obtained channel qualities. After the selection from the first set of filters, the access point 102 may determine a corresponding subset from the second set of filters. A filter or filters in the subset can avoid overlap between the 320 MHz-1 frequency band and 320 MHz-2 frequency band.

In some implementations, the 6G Wi-Fi module 106 may scan channels in the 320 MHz-2 frequency band to obtain configuration information. In some implementations, the 6G Wi-Fi module 106 may scan channels in the 320 MHz-2 frequency band by using each of the subset of filters to obtain the configuration information. The configuration information may include information of a priority of filters in the subset of filters, such as a priority list or a table. After the configuration information is obtained, a filter will be determined for the antenna 110.

In some implementations, the 6G Wi-Fi module 106 may obtain channel qualities corresponding to filters in the subset of filters. The 6G Wi-Fi module 106 may select a filter of the subset of filters based on the obtained channel qualities. As such, an overlap between the 320 MHz-1 frequency band and 320 MHz-2 frequency band can be eliminated.

Figure 1C:
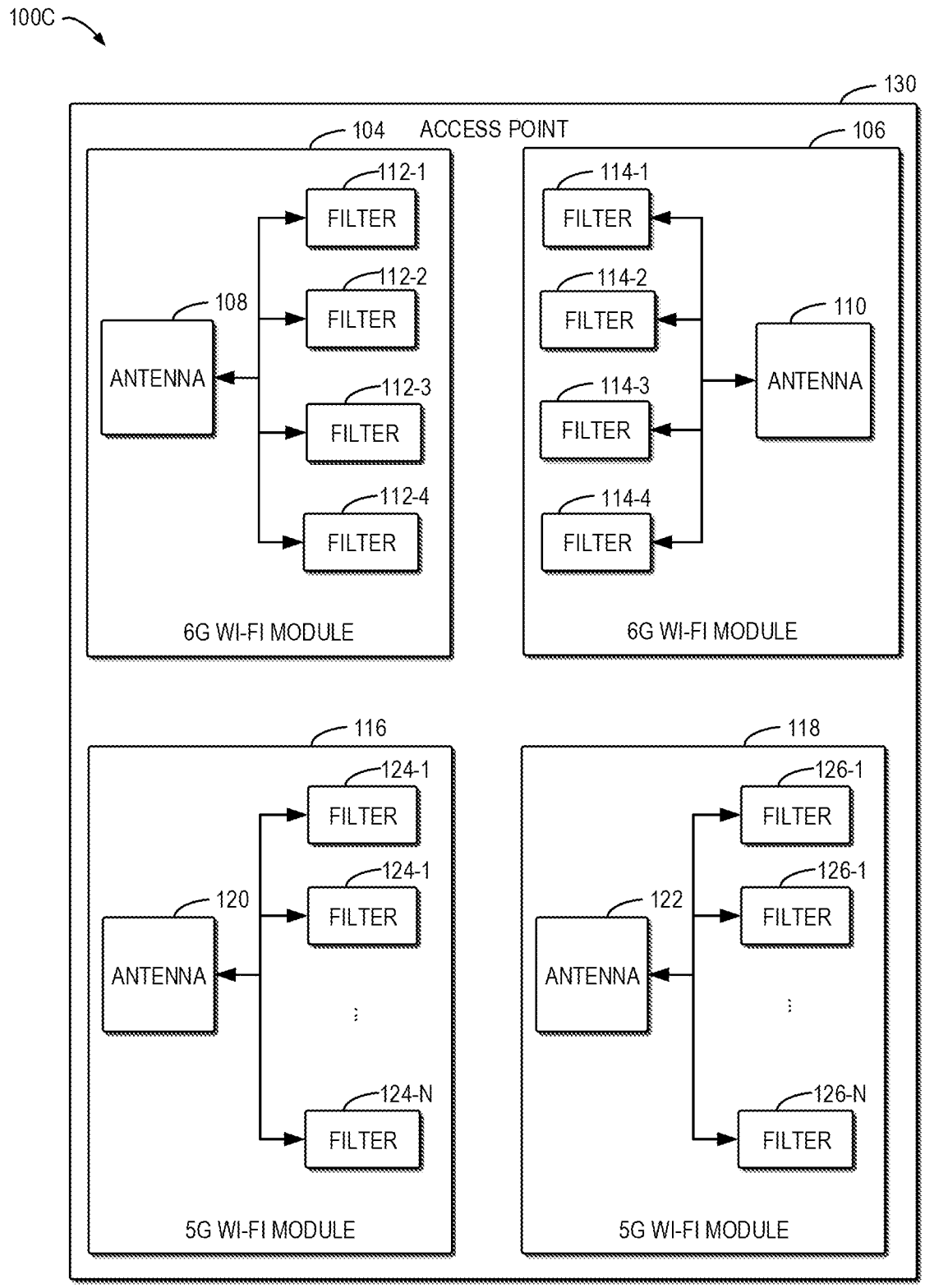
FIG. 1C illustrates a block diagram of another example environment in which example implementations of the present disclosure may be implemented.

FIG. 1C illustrates a block diagram of another example environment 100C in which example implementations of the present disclosure may be implemented. As shown in FIG. 1C, the environment 100C comprises an access point 130. The access point 130 comprises the two 6 GHz Wi-Fi modules, including the 6 GHz Wi-Fi module 104 and the 6 GHz Wi-Fi module 106.

The environment 100C further comprises the two 5 GHz Wi-Fi modules, which are the 5 GHz Wi-Fi module 116 and the 5 GHz Wi-Fi module 118. The 5 GHz Wi-Fi module 116 includes an antenna 120. The 5 GHz Wi-Fi module 116 further includes a filter 124-1, a filter 124-2, . . . , and a filter 112-N, where N is an integer. Any one of the filters 124-1, 124-2 through 124-N may be referred as a seventh filter. Likewise, the 5 GHz Wi-Fi module 118 includes an antenna 122. The 5 GHz Wi-Fi module 118 further includes a filter 126-1, a filter 126-2, . . . , and a filter 126-N, where N is an integer. Any one of the filters 126-1, 126-N through 126-N may be also referred as an eighth filter.

In the environment 100C, the 6 GHz Wi-Fi module 104 and the 6 GHz Wi-Fi module 106, and the 5 GHz Wi-Fi module 116 and the 5 GHz Wi-Fi module 118 can work alone or work together in any combination. As such, the access point 130 can support 6 Hz and 5 GHz Wi-Fi simultaneously.

Figure 2:
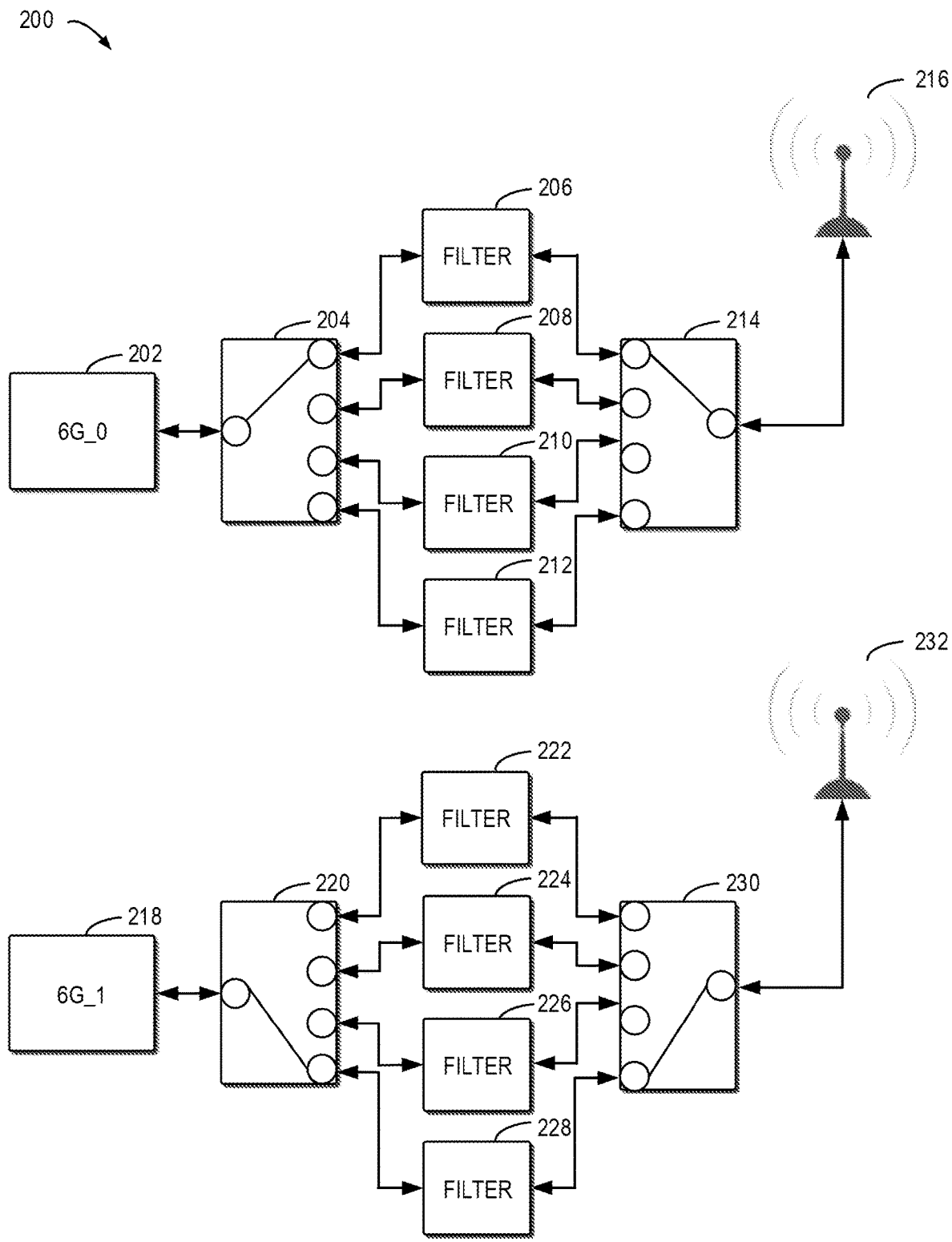
FIG. 2 illustrates an example architecture of an access point according to implementations of the present disclosure.

FIG. 2 illustrates an example of an architecture 200 of an access point according to implementations of the present disclosure. As shown in FIG. 2, the architecture 200 comprises a 6G_0 module 202 and a 6G_1 module 218. The 6G_0 module 202 includes a switch 204 and a switch 214. The switch 204 may be switched to select a filter of a set of filters 206, 208, 210 and 212. The filter 206 may correspond to the filter 112-1, the filter 208 may correspond to the filter 112-2, the filter 210 may correspond to the filter 112-3, and the filter 212 may correspond to the filter 112-4.

The switch 204 may be connected between the 6G_0 module 202 and the filter 206, the filter 208, the filter 210 and the filter 212. The antenna 216 may correspond to the antenna 120. The filter 206, the filter 208, the filter 210 and the filter 212 may be connected to the antenna 216 via the switch 214. For example, the switch 204 and the switch 214 may be single pole double throw (SPDT) switches. Each filter of the four filters 206, 208, 210 and 212 may have a predetermined frequency range in the 320 MHz frequency band. For example, the filter 206 may have a predetermined frequency range of 5945 MHz to 6265 MHz, which may correspond to channel 31. The filter 208 may have a predetermined frequency range of 6265 MHz to 6585 MHz, which may correspond to channel 95. The filter 210 may have a predetermined frequency range of 6585 MHz to 7125 MHz, which may correspond to channel 159. The filter 212 may have a predetermined frequency range of 6105 MHz to 6425 MHz, which may correspond to channel 63.

As shown in FIG. 2, the 6G_1 module 218 includes a switch 220. The switch 220 may be switched to select a filter of a set of filters 222, 224, 226 and 228. The filter 222 may correspond to the filter 114-1, the filter 224 may correspond to the filter 114-2, the filter 226 may correspond to the filter 114-3, and the filter 228 may correspond to the filter 114-4. The switch 220 may be connected between the 6G_1 module 218 and the filter 222, the filter 224, the filter 226 and the filter 228. The antenna 232 may correspond to the antenna 122. The filter 222, the filter 224, the filter 226 and the filter 228 may be connected to the antenna 232 via the switch 230.

Each filter of the four filters 222, 224, 226 and 228 may have a predetermined frequency range in the 320 MHz frequency band. For example, the filter 222 may have a predetermined frequency range of 6105 MHz to 6425 MHz, which may correspond to channel 63. The filter 224 may have a predetermined frequency range of 6425 MHz to 6745 MHz, which may correspond to channel 127. The filter 226 may have a predetermined frequency range of 6745 MHz to 7125 MHz, which may correspond to channel 191. The filter 228 may have a predetermined frequency range of 6585 MHz to 7125 MHz, which may correspond to channel 159.

In some implementations, when the filter 206 is selected for the antenna 216, a corresponding subset from the set of the filter 222, the filter 224, the filter 226 and the filter 228 will be determined. As an example implementation, one of such subsets may be a subset including the filter 224, the filter 226 and the filter 228. As another example implementation, when the filter 208 is selected for the antenna 216, a corresponding subset from the set of the filter 222, the filter 224, the filter 226 and the filter 228 will be determined. As an example implementation, one of such subsets may be a subset including only the filter 226. In yet another example implementation, when the filter 210 is selected for the antenna 216, a corresponding subset from the set of the filter 222, the filter 224, the filter 226 and the filter 228 will be determined. As an example implementation, one of such subsets may be a subset including only the filter 222. In a further example implementation, when the filter 212 is selected for the antenna 216, a corresponding subset from the set of the filter 222, the filter 224, the filter 226 and the filter 228 will be determined. As an example implementation, one of such subsets may be a subset including the filter 226 and the filter 228.

In some implementations, a filter for the antenna 232 is first determined from the set of filters 222, 224, 226 and 228. For example, if the filter 222 is selected for the antenna 232, a corresponding subset from the set of the filter 206, the filter 208, the filter 210 and the filter 212 will be then determined. As an example implementation, one of such subsets may be a subset including only the filter 210. As another example implementation, when the filter 224 is selected for the antenna 232, a corresponding subset from the set of the filter 206, the filter 208, the filter 210 and the filter 212 will be determined. As an example implementation, one of such subsets may be a subset including only the filter 206. In yet another example implementation, when the filter 226 is selected for the antenna 232, a corresponding subset from the set of the filter 206, the filter 208, the filter 210 and the filter 212 will be determined. As an example implementation, one of such subsets may be a subset including the filter 206, the filter 208 and the filter 212. In a further example implementation, when the filter 228 is selected for the antenna 232, a corresponding subset from the set of the filter 206, the filter 208, the filter 210 and the filter 212 will be determined. As an example, one of such subsets may be a subset including the filter 206 and the filter 212.

Figure 3:
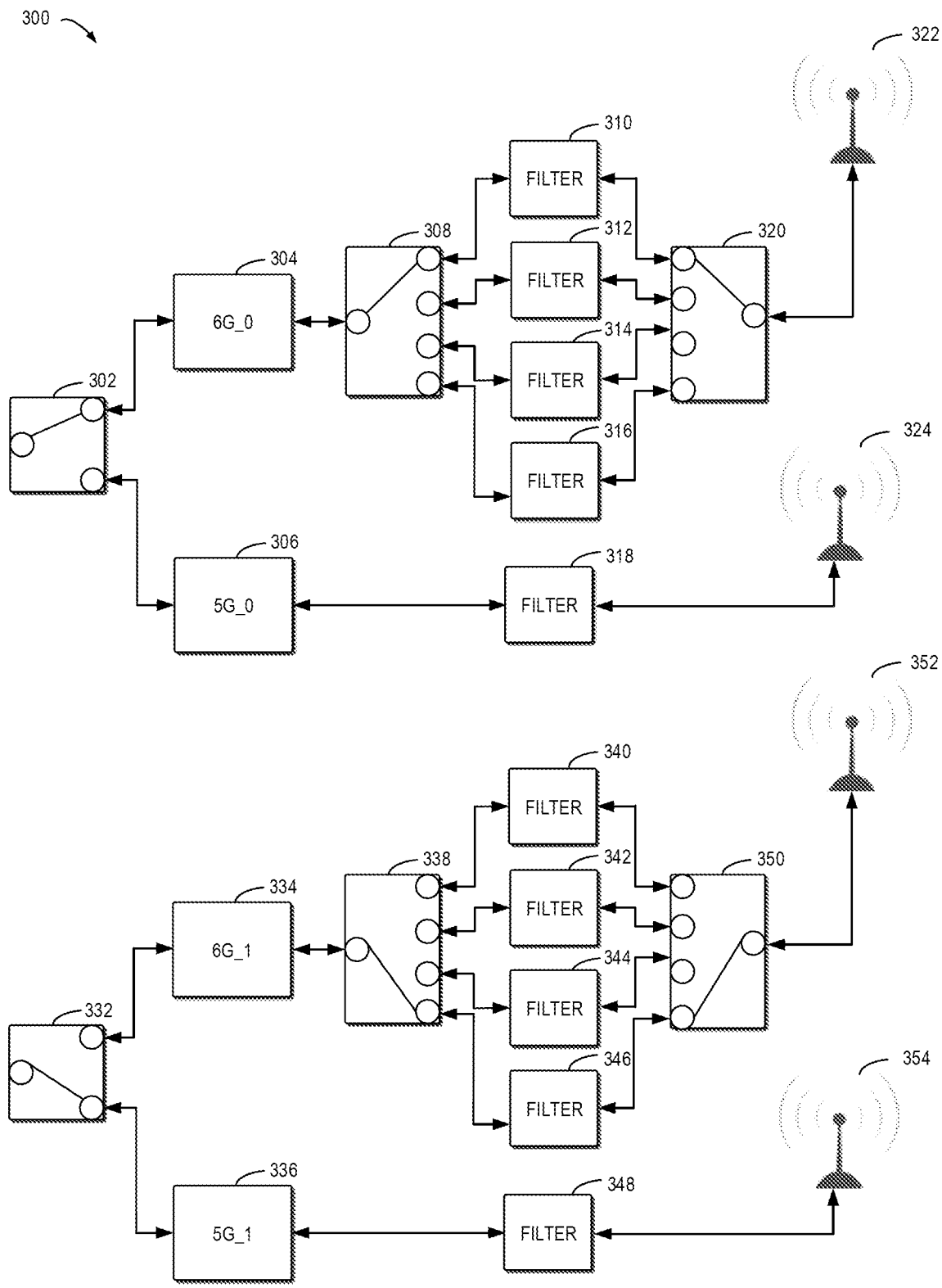
FIG. 3 illustrates another example architecture of an access point according to implementations of the present disclosure.

FIG. 3 illustrates another example of an architecture 300 of an access point according to implementations of the present disclosure. As shown in FIG. 3, a switch 302 is connected to a 6G_0 module 304 and a 5G_0 module 306, and the 6G_0 module 304 may correspond to the 6G_0 module 202. The switch 302 may be switched to select 6 GHz frequency band or 5 GHz frequency band.

The 6G_0 module 304 is connected to a switch 308. The switch 308 may be switched to select a filter of a set of filters 310, a filter 312, a filter 314 and a filter 316 for an antenna 322. The filter 310 may correspond to the filter 206, the filter 312 may correspond to the filter 208, the filter 314 may correspond to the filter 210, and filter 316 may correspond to the filter 212.

The 5G_0 module 306 is connected to a filter 318. The filter 318 may be used for an antenna 324. By controlling the switch 302, the 6G_0 module 304 and the 5G_0 module 306 may be switched to be turned on when necessary. In some implementations, the 5G_0 306 may also be connected to a switch that may be switched to select a filter between several filters of several frequency bands.

As shown in FIG. 3, a switch 332 is connected to a 6G_1 module 334 and a 5G_1 module 336, and the 6G_1 module 334 may correspond to the 6G_1 module 218. The 6G_1 module 334 is connected to a switch 338. The switch 338 may be switched to select a filter of a set of filters 340, 342, 344 and 346. The filter 340 may correspond to the filter 222, the filter 342 may correspond to the filter 224, the filter 344 may correspond to the filter 226, and the filter 346 may correspond to the filter 228.

The 5G_1 module 336 is connected to a filter 348. The filter 348 is used for an antenna 354. By controlling the switch 332, the 6G_1 module 334 and the 5G_1 module 336 can be switched to be turned on when necessary. In some implementations, the 5G_1 module 336 may also be connected to a switch that may be switched to select a filter between several filters of several frequency bands.

With such example architecture 300 as illustrated in FIG. 3, the access point can work on both 6 GHz and 5 GHz frequency bands. As an example implementation, the 6 GHz Wi-Fi module 304 and the 5 GHz Wi-Fi module 336 can work together. For another example, the 5 GHz Wi-Fi module 306 and the 6 GHz Wi-Fi module 334 can work together.

FIG. 4A illustrates an example of channels 400A for the first set of filters according to implementations of the present disclosure. As discussed in FIG. 4A, the channel 31 may be on a frequency band of 5945 MHz to 6265 MHz, the channel 95 may be on a frequency band of 6265 MHz to 6585 MHz, the channel 159 may be on a frequency band of 6585 MHz to 6905 MHz, and the channel 63 may be on a frequency band of 6105 MHz to 6425 MHz. In some implementations, each of the channel 31, the channel 95, the channel 159 and the channel 63 may be selected as a working channel. Each of the channel 31, the channel 95, the channel 159 and the channel 63 may correspond to a filter. In some implementations, the channel 31 may correspond to the filter 112-1, the channel 95 may correspond to the filter 112-2, the channel 159 may correspond to the filter 112-3, and the channel 63 may correspond to the filter 112-4.

FIG. 4B illustrates an example of channels 400B for the second set of filters according to implementations of the present disclosure. As discussed in FIG. 4B, the channel 63 may be on a frequency band of 5945 MHz to 6265 MHz, the channel 95 may be on a frequency band of 6105 MHz to 6425 MHz, the channel 127 may be on a frequency band of 6425 MHz to 6745 MHz, and the channel 191 may be on a frequency band of 6745 MHz to 7065 MHz. In some implementations, each of the channel 63, the channel 127, the channel 191 and the channel 159 can be selected as a working channel. Each of the channel 63, the channel 127, the channel 191 and the channel 159 may correspond to a filter. In some implementations, the channel 63 may correspond to the filter 114-1, the channel 127 may correspond to the filter 114-2, the channel 191 may correspond to the filter 114-3, and the channel 159 may correspond to the filter 114-4.

FIGS. 5A-5D illustrate some examples of mappings for first selecting a filter in the first set of filters and then selecting a filter in the second set of filters according to implementations of the present disclosure. As illustrated by 500A in FIG. 5A, if a switch 502 is switched to a filter 504, the channel 31 may be selected as the working frequency band for the first antenna. The filter 504 may be used to filter the first antenna. In this case, a subset of a filter 508, a filter 510 and a filter 512 may be determined according to the mappings.

In some implementations, any filter of the determined subset can be selected as the filter for the second antenna. As an example implementation, the filter 508 may be selected as the working filter. The channel 127 is determined as the working channel. As another example implementation, the filter 510 may be selected as the working filter, and the channel 191 may be determined as the working channel. As yet another example, the filter 512 may be selected as the working filter, and the channel 159 may be determined as the working channel.

Figure 5A:
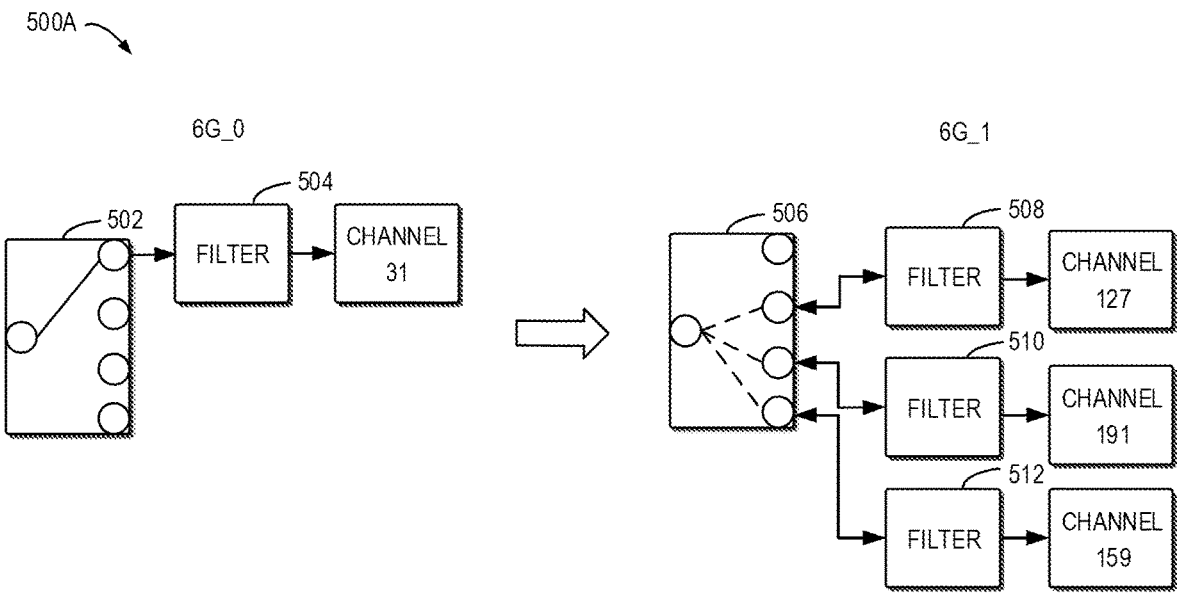
FIGS. 5A-5D illustrate some examples of mappings for first selecting a filter in the first set of filters and then selecting a filter in the second set of filters according to implementations of the present disclosure.
Figure 5B:
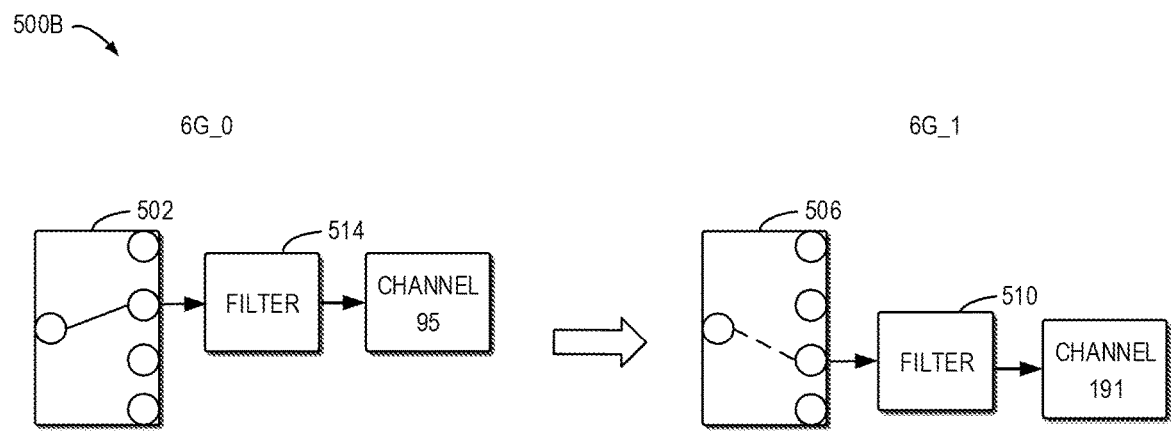

As illustrated by 500B in FIG. 5B, if a switch 502 is switched to a filter 514, the channel 95 may be selected as the working frequency band for the first antenna. The filter 514 may be used to filter the first antenna. In this case, a subset of the filter 510 may be determined, and only the filter 510 can be selected as the filter for the second antenna. The channel 191 is determined as the working channel.

Figure 5C:
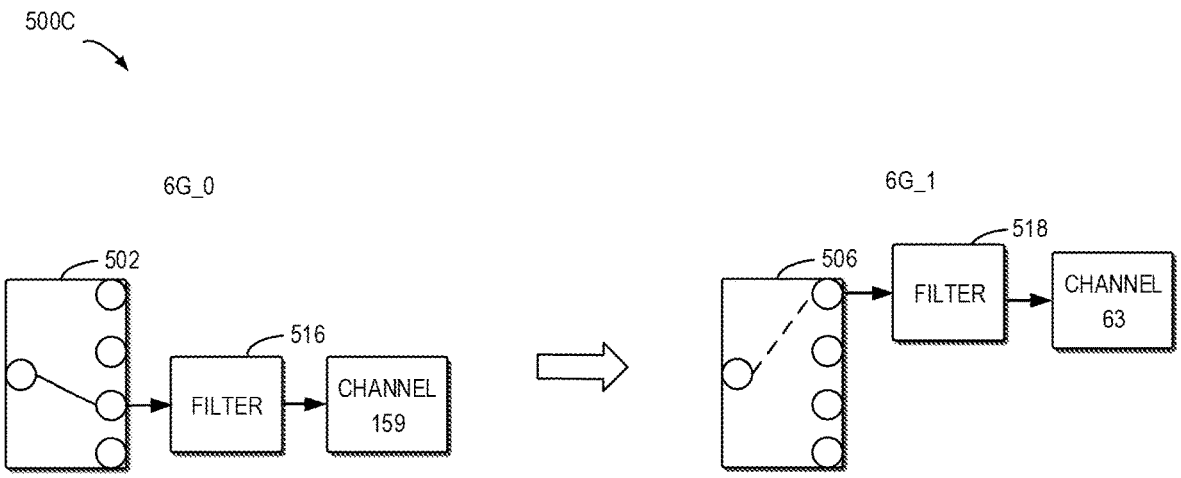

As illustrated by 500C in FIG. 5C, if a switch 502 is switched to a filter 516, the channel 159 may be selected as the working frequency band for the first antenna. The filter 516 may be used to filter the first antenna. In this case, a subset of the filter 518 may be determined, and only the filter 518 can be selected as the filter for the second antenna. The channel 63 is determined as the working channel.

Figure 5D:
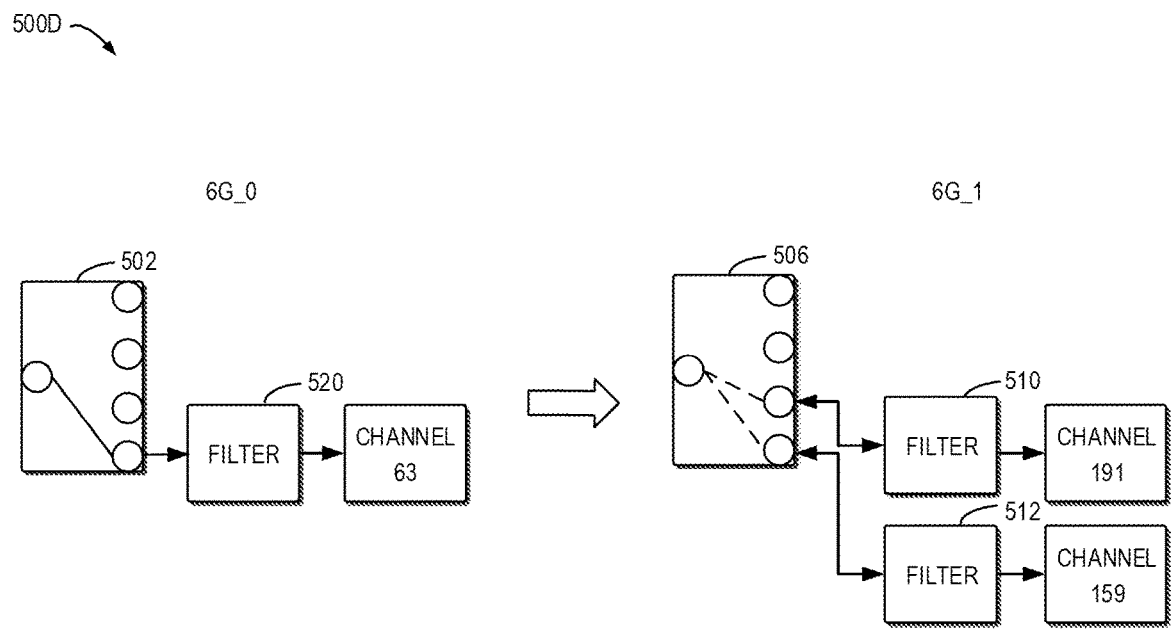

As illustrated by 500D in FIG. 5D, if a switch 502 is switched to a filter 520, the channel 63 is selected as the working frequency band for the first antenna. The filter 520 may be used to filter the first antenna. In this case, a subset of a filter 510 and a filter 512 may be determined. In some implementations, any one of the determined subsets may be selected as the filter for the second antenna. As an example implementation, the filter 510 may be selected as the working filter. The channel 191 may be determined as the working channel. As another example implementation, the filter 512 may be selected as the working filter. The channel 159 may be determined as the working channel.

FIGS. 6A-6D illustrate some examples of mappings for first selecting a filter in the second set of filters and then selecting a filter in the first set of filters according to implementations of the present disclosure. In FIGS. 6A-6D, a filter for the second antenna in 6G_1 is determining first, and on this basis, a filter for the first antenna in 6G_0 will be selected.

Figure 6A:
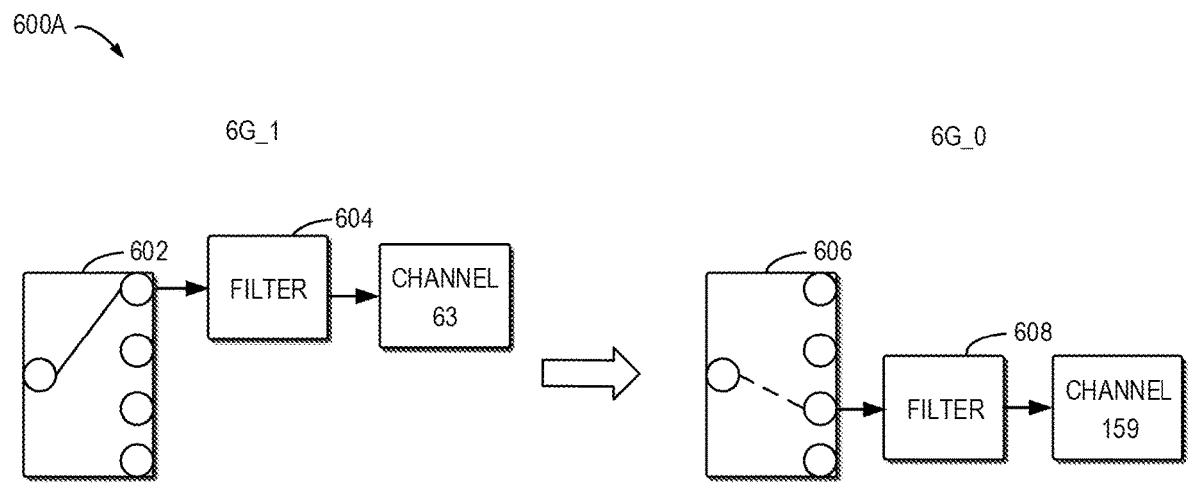
FIGS. 6A-6D illustrate some examples of mappings for first selecting a filter in the second set of filters and then selecting a filter in the first set of filters according to implementations of the present disclosure.

As illustrated by 600A in FIG. 6A, if a switch 602 is switched to a filter 604, the channel 63 may be selected as the working frequency band for the second antenna. The filter 604 may be used to filter the second antenna. In this case, a subset of a filter 608 may be determined. In this case, the only filter 608 can be selected as the filter for the first antenna. The channel 159 may be determined as the working channel.

Figure 6B:
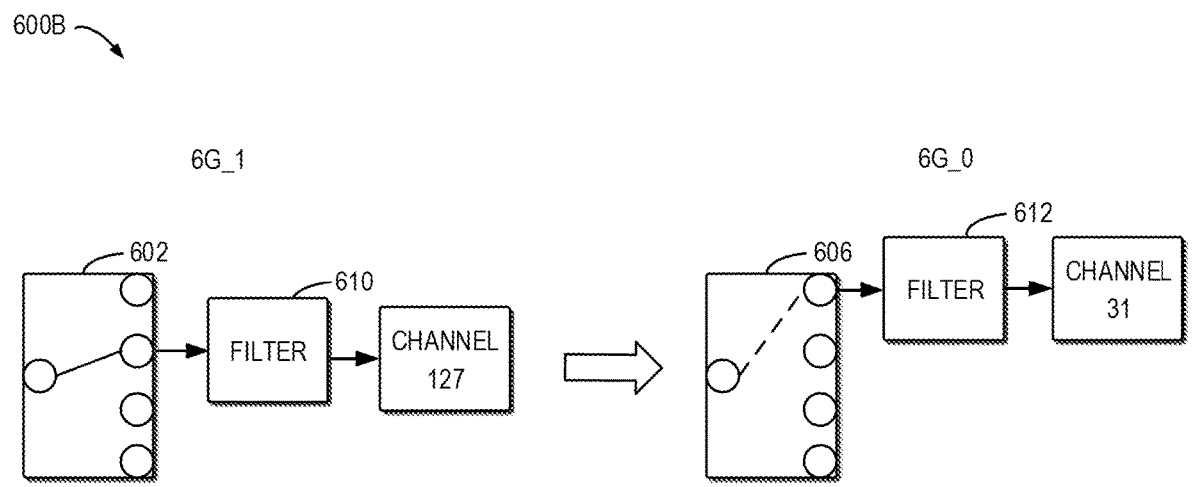

As illustrated by 600B in FIG. 6B, if a switch 602 is switched to a filter 610, the channel 127 is selected as the working frequency band for the second antenna. The filter 610 may be used to filter the second antenna. In this case, a subset of the filter 612 may be determined. Thus, only the filter 612 can be selected as the filter for the first antenna. The channel 31 is determined as the working channel.

Figure 6C:
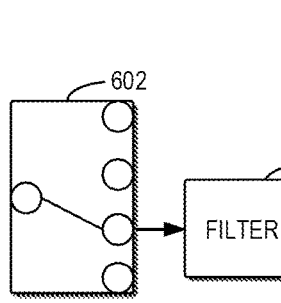
Figure 6C:
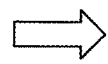
Figure 6C:
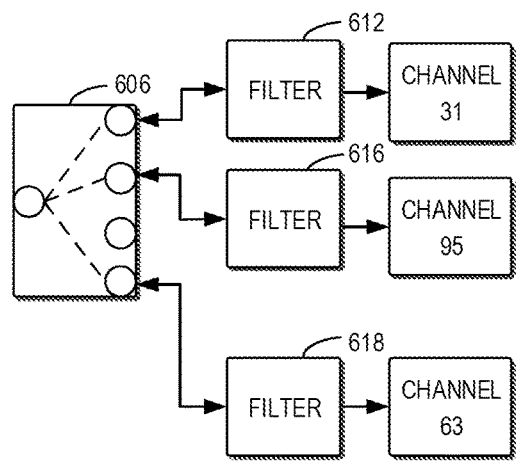

As illustrated by 600C in FIG. 6C, if a switch 602 is switched to a filter 614, the channel 191 is selected as the working frequency band for the second antenna. The filter 614 may be used to filter the second antenna. In this case, a subset of the filters 612, 616 and 618 may be determined. In some implementations, any filter of the determined subset can be selected as the filter for the second antenna. As an example implementation, the filter 612 may be selected as the working filter, and the channel 31 may be determined as the working channel for the first antenna. As another example implementation, the filter 616 may be selected as the working filter, and the channel 95 is determined as the working channel for the first antenna. As yet another example, the filter 618 may be selected as the working filter, and the channel 63 may be determined as the working channel for the first antenna.

Figure 6D:
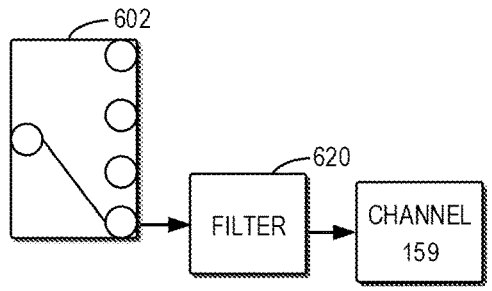
Figure 6D:
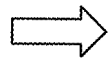
Figure 6D:
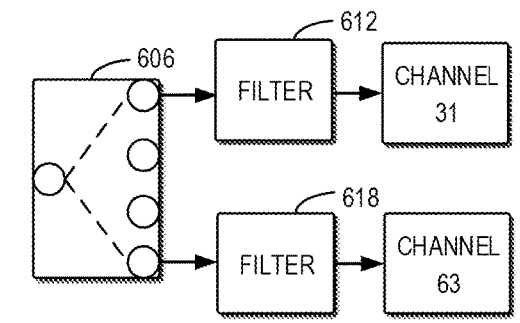

As illustrated by 600D in FIG. 6D, if a switch 602 is switched to a filter 620, the channel 159 is selected as the working frequency band for the second antenna. The filter 620 may be used to filter the second antenna. In this case, a subset of a filter 612 and a filter 618 may be determined for the first antenna. In some implementations, any one of the determined subsets can be selected as the filter for the second antenna. As an example implementation, the filter 612 may be selected as the working filter, and the channel 31 may be determined as the working channel for the first antenna. As another example implementation, the filter 618 may be selected as the working filter, and the channel 63 may be determined as the working channel for the first antenna.

Figure 7:
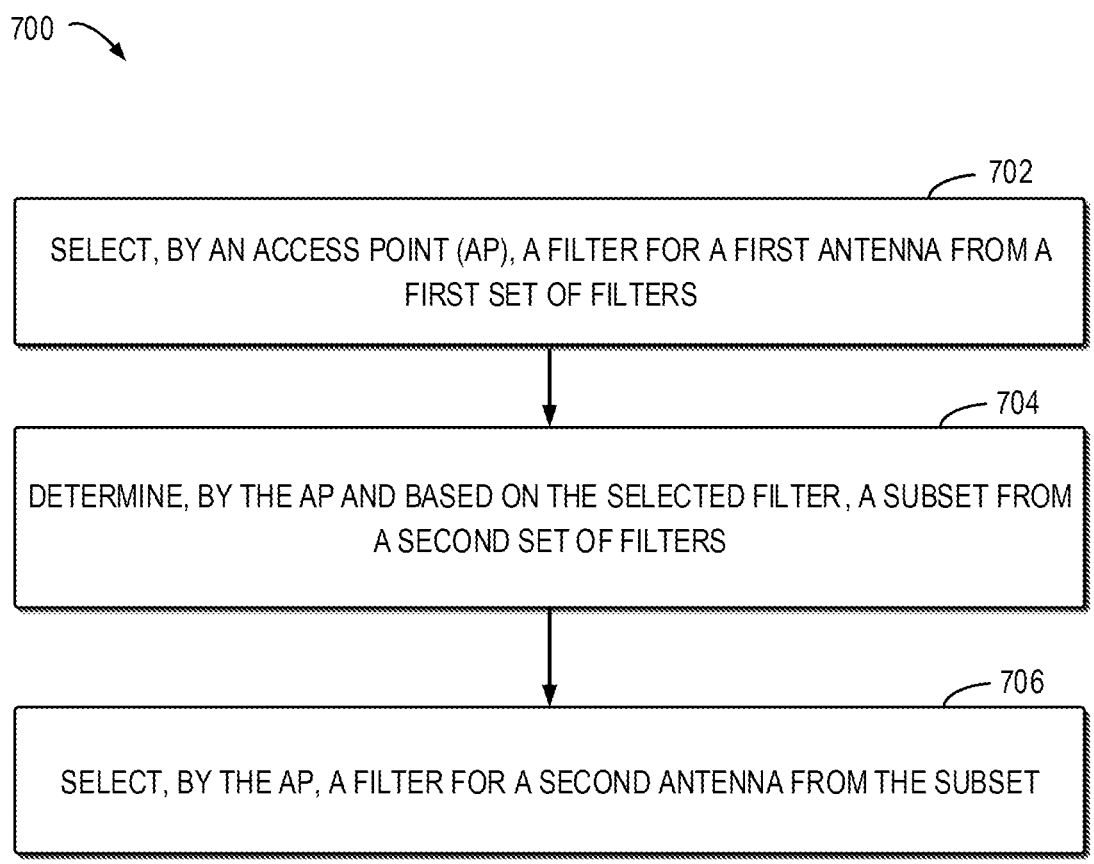
FIG. 7 illustrates a flow chart of an example method for selecting a filter in the first set of filters and a filter in the second set of filters according to implementations of the present disclosure.

FIG. 7 illustrates a flow chart of an example method 700 for selecting a filter in the first set of filters and a filter in the second set of filters according to implementations of the present disclosure, and the method 700 may be performed by an access point such as the access point 102 or access point 130. For clarity, reference will be made in combination with FIG. 1B. At 702, the access point 102 selects a filter for a first antenna from a first set of filters. As an example implementation, the access point 102 may select the filter 112-1 for the antenna 108 from the set of filters 112-1, 112-2, 112-3 and 112-4. As another example implementation, the access point 102 may select the filter 112-4 for the antenna 108 from the set of filters 112-1, 112-2, 112-3 and 112-4.

In some implementations, the access point 102 may obtain a configuration for the set of filters 112-1, 112-2, 112-3 and 112-4. In some implementations, the configuration indicates a priority of filters of the set of filters 112-1, 112-2, 112-3 and 112-4. After obtaining the configuration, the access point 102 may select a proper filter for the antenna 108 from the set of filters 112-1, 112-2, 112-3 and 112-4. For example, the selected filter 112-1 may be the top filter in a priority list of the configuration.

In some implementations, the access point 102 may obtain channel qualities corresponding to filters of the set of filters 112-1, 112-2, 112-3 and 112-4. The access point 102 may sort the filters of the set of filters 112-1, 112-2, 112-3 and 112-4, and the access point may determine which channel has a better channel quality. The access point 102 may select, based on the sorting, the filter for the antenna 108 from the set of filters 112-1, 112-2, 112-3 and 112-4. As an example implementation, the selected filter 112-1 may correspond to the best channel quality.

In some implementations, the access point 102 may receive channel quality indicators (CQIs) of channels corresponding to the filters in the set of filters 112-1, 112-2, 112-3 and 112-4. Based on the received CQIs, the access point 102 may determine the channel qualities corresponding to filters 112-1, 112-2, 112-3 and 112-4.

At 704, the access point 102 determines, based on the selected filter, a subset from a second set of filters. As an example implementation, after the filter 112-1 is selected, the access point 102 may determine, based on the selected filter 112-1, a subset of the filters 114-2, 114-3 and 114-4 from the set of filters 114-1, 114-2, 114-3 and 114-4. As another example implementation, if the filter 112-4 is selected, the access point 102 may determine, based on the selected filter 112-4, a subset of the filters 114-3 and 114-4 from the second set of filters.

In some implementations, the access point 102 may obtain a mapping between a filter of the set of filters 112-1, 112-2, 112-3 and 112-4, and a corresponding subset of the set of filters 114-1, 114-2, 114-3 and 114-4. Based on the obtained mapping, the access point 102 may determine the subset from the set of filters 114-1, 114-2, 114-3 and 114-4. The details of the mapping are described with reference to FIG. 5A to FIG. 6D. For brevity, the details of the mapping will not discussed herein.

At 706, the access point 102 selects a filter for a second antenna from the subset. As an example implementation, in the case that the filter 112-1 is selected for the antenna 108, the access point 102 may select the filter 114-2 from the determined subset for the antenna 110. As another example implementation, the access point 102 may select the filter 114-3 from the determined subset for the antenna 110. As yet another example, the access point 102 may select the filter 114-4 from the determined subset for the antenna 110.

In some implementations, the access point 102 may determine frequency gaps between the selected filter in the set of filters 112-1, 112-2, 112-3 and 112-4, and filters in the subset. For example, if the filter 112-1 is determined and the subset of filters 114-2, 114-3 and 114-4 is determined, the access point may determine the frequency gap between the filter 112-1 and each of the filters 114-2, 114-3 and 114-4. In some implementations, based on the frequency gaps, the access point 102 may select a filter from the subset. As an example implementation, the access point 102 may select the filter 114-3 from the subset, because the frequency gap between the filter 112-1 and the filter 114-3 is the largest among other pairs of filters.

In some implementations, as discussed above, the access point 102 may determine channel qualities corresponding to filters in the subset. Based on the determined channel qualities, the access point 102 may select a filter from the subset. As an example implementation, the access point 102 may select the filter 114-2 from the subset of the filters 114-2, 114-3 and 114-4 because the filter 114-2 corresponds to the best channel quality.

According to implementations of the present disclosure, the access point can utilize all channels in 6G frequency band. All 320 MHz channels can be selected due to the filters combination from the two sets of filters. As one of the advantages, all 6 GHz channels are available, and no channel will be discarded if the filters are selected properly. As another one of the advantages, since the selection mechanism of the filters is flexible, it can achieve more flexible combination for dual 320 MHz usage scenarios.

Figure 8:
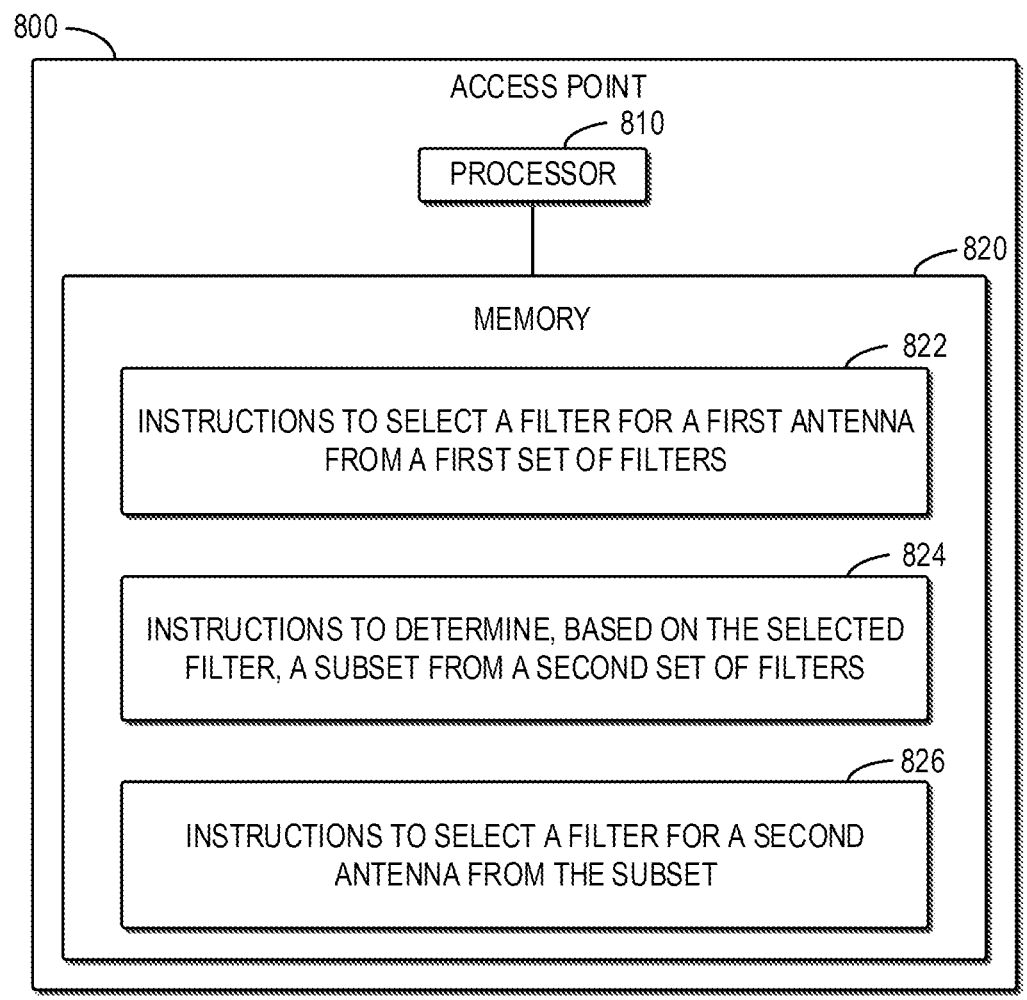
FIG. 8 illustrates an example access point according to implementations of the present disclosure.

FIG. 8 illustrates an example access point 800 according to implementations of the present disclosure. As shown in FIG. 8, the access point 800 comprises at least one processor 810, and a memory 820 coupled to the at least one processor 810. The memory 820 stores instructions 822, 824 and 826 to cause the processor 810 to perform actions according to example implementations of the present disclosure.

As shown in FIG. 8, the memory 820 stores instructions 822 to select a filter for a first antenna from a first set of filters. The memory 820 further stores instructions 824 to determine a subset from a second set of filters based on the selected filter. The memory 820 further stores instructions 826 to select a filter for a second antenna from the subset. The stored instructions and the functions that the instructions may perform can be understood with reference to description of FIG. 7. For brevity, the details of instructions 822, 824 and 826 will not be discussed herein.

Program codes or instructions for carrying out methods of the present disclosure may be written in any combination of one or more programming languages. These program codes or instructions may be provided to a processor or controller of a general-purpose computer, special-purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine, or entirely on the remote machine or server.

Program codes or instructions for carrying out methods of the present disclosure may be written in any combination of one or more programming languages. These program codes or instructions may be provided to a processor or controller of a general-purpose computer, special-purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine, or entirely on the remote machine or server.

In the context of this disclosure, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but is not limited to an electronic, magnetic, optical, electromagnetic, infrared, or semiconductor system, apparatus, device, or any suitable combination of the foregoing. More specific examples of the machine-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order or that all illustrated operations be performed to achieve desirable results. In certain circumstances, multitasking and parallel processing may be advantageous. Certain features that are described in the context of separate implementations may also be implemented in combination in a single implementation. Conversely, various features that are described in the context of a single implementation may also be implemented in multiple implementations separately or in any suitable sub-combination.

In the foregoing Detailed Description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed is:

1. A method, comprising:
   selecting, by an access point (AP), a filter for a first antenna from a first set of filters, wherein the first set of filters includes a first filter, a second filter, a third filter and a fourth filter, and the AP operates in 320 megahertz (MHz) channels of a 6 gigahertz (GHz) frequency band;
   determining, by the AP and based on the selected filter, a subset from a second set of filters, wherein the second set of filters includes the third filter, the fourth filter, a fifth filter and a sixth filter; and
   selecting, by the AP, a filter for a second antenna from the subset,
   wherein the first filter, the second filter and the third filter work on a first frequency band, the fourth filter, the fifth filter and the sixth filter work on a second frequency band, and the second frequency band has a higher starting frequency than the first frequency band.

2. The method according to claim 1, wherein selecting the filter for the first antenna from the first set of filters comprises:
   obtaining, by the AP, a configuration for the first set of filters, wherein the configuration indicates a priority of filters in the first set of filters; and
   selecting, by the AP and based on the configuration, the filter for the first antenna from the first set of filters.

3. The method according to claim 1, wherein selecting the filter for the first antenna from the first set of filters comprises:

obtaining, by the AP, channel qualities corresponding to filters in the first set of filters;
sorting, by the AP and based on the channel qualities, the filters in the first set of filters; and
selecting, by the AP and based on the sorting, the filter for the first antenna from the first set of filters.

4. The method according to claim 3, wherein obtaining the channel qualities corresponding to filters in the first set of filters comprises:
receiving, by the AP, channel quality indicators (CQIs) of channels corresponding to the filters in the first set of filters; and
determining, by the AP and based on the CQIs, the channel qualities corresponding to the filters in the first set of filters.

5. The method according to claim 1, wherein determining the subset from the second set of filters comprises:
obtaining, by the AP, a mapping between a filter of the first set of filters and a corresponding subset of the second set of filters; and
determining, by the AP, the subset from the second set of filters based on the mapping.

6. The method according to claim 1, wherein selecting the filter for the second antenna from the subset comprises:
determining, by the AP, frequency gaps between the selected filter in first set of filters and filters in the subset; and
selecting, by the AP and based on the frequency gaps, a filter from the subset.

7. The method according to claim 1, wherein selecting the filter for the second antenna from the subset comprises:
determining, by the AP, channel qualities corresponding to filters in the subset; and
selecting, by the AP and based on the channel qualities, a filter from the subset.

8. The method according to claim 1, further comprising:
in response to the filter of the first set of filters and the filter of the second set of filters being selected, filtering signals for the first antenna and the second antenna using the two selected filters, respectively.

9. The method according to claim 8, wherein the AP further comprises a seventh filter for a third antenna and a eighth filter for a fourth antenna working on a 5G frequency band.

10. The method according to claim 1, comprising at least one of:
the first filter being configured to work on a frequency band of 5945 MHz to 6265 MHz;
the second filter being configured to work on a frequency band of 6265 MHz to 6585 MHz;
the third filter being configured to work on a frequency band of 6585 MHz to 7125 MHz;
the fourth filter being configured to work on a frequency band of 6105 MHz to 6425 MHz;
the fifth filter being configured to work on a frequency band of 6425 MHz to 6745 MHz; or
the sixth filter being configured to work on a frequency band of 6745 MHz to 7125 MHz.

11. An access point (AP) comprising:
at least one processor; and
a memory coupled to the at least one processor, the memory storing instructions to cause the at least one processor to:
select a filter for a first antenna from a first set of filters, wherein the first set of filters includes a first filter, a second filter, a third filter and a fourth filter, and the AP operates in 320 megahertz (MHz) channels of a 6 gigahertz (GHz) frequency band;
determine, based on the selected filter, a subset from a second set of filters, wherein the second set of filters includes the third filter, the fourth filter, a fifth filter and a sixth filter; and
select a filter for a second antenna from the subset,
wherein the first filter, the second filter and the third filter work on a first frequency band, the fourth filter, the fifth filter and the sixth filter work on a second frequency band, and the second frequency band has a higher starting frequency than the first frequency band.

12. The AP according to claim 11, wherein the instructions to select the filter for the first antenna from the first set of filters comprise instructions to cause the at least one processor to:
obtain a configuration for the first set of filters, wherein the configuration indicates a priority of filters in the first set of filters; and
select, based on the configuration, the filter for the first antenna from the first set of filters.

13. The AP according to claim 11, wherein the instructions to select the filter for the first antenna from the first set of filters comprise instructions to cause the at least one processor to:
obtain channel qualities corresponding to filters in the first set of filters;
sort, based on the channel qualities, the filters in the first set of filters; and
select, based on the sorting, the filter for the first antenna from the first set of filters.

14. The AP according to claim 13, wherein the instructions to obtain the channel qualities corresponding to filters in the first set of filters comprise instructions to cause the at least one processor to:
receive channel quality indicators (CQIs) of channels corresponding to the filters in the first set of filters; and
determine, based on the CQIs, the channel qualities corresponding to the filters in the first set of filters.

15. The AP according to claim 11, wherein the instructions to determine the subset from the second set of filters comprise instructions to cause the at least one processor to:
obtain a mapping between a filter of the first set of filters and a corresponding subset of the second set of filters; and
determine the subset from the second set of filters based on the mapping.

16. The AP according to claim 11, wherein the instructions to select the filter for the second antenna from the subset comprise instructions to cause the at least one processor to:
determine frequency gaps between the selected filter in first set of filters and filters in the subset; and
select, based on the frequency gaps, a filter from the subset.

17. The AP according to claim 11, wherein the instructions to select the filter for the second antenna from the subset comprise instructions to cause the at least one processor to:
determine channel qualities corresponding to filters in the subset; and
select, based on the channel qualities, a filter from the subset.

18. The AP according to claim 11, further comprising instructions to cause the at least one processor to:

in response to the filter of the first set of filters and the filter of the second set of filters being selected, filter signals for the first antenna and the second antenna using the two selected filters, respectively.

19. The AP according to claim 18, wherein the AP further comprises a seventh filter for a third antenna and a eighth filter for a fourth antenna working on a 5G frequency band.

20. A non-transitory computer-readable medium comprising instructions stored thereon which, when executed by an access point (AP), cause the AP to:
  select a filter for a first antenna from a first set of filters, wherein the first set of filters includes a first filter, a second filter, a third filter and a fourth filter, and the AP operates in 320 megahertz (MHz) channels of a 6 gigahertz (GHz) frequency band;
  determine, based on the selected filter, a subset from a second set of filters, wherein the second set of filters includes the third filter, the fourth filter, a fifth filter and a sixth filter; and
  select a filter for a second antenna from the subset, wherein the first filter, the second filter and the third filter work on a first frequency band, the fourth filter, the fifth filter and the sixth filter work on a second frequency band, and the second frequency band has a higher starting frequency than the first frequency band.

* * * * *